UNITED STATES PATENT OFFICE.

ADAM GOOD, OF SAN FRANCISCO, CALIFORNIA.

COMPOSITION FOR PRESERVING EGGS.

SPECIFICATION forming part of Letters Patent No. 225,518, dated March 16, 1880.

Application filed April 7, 1879.

*To all whom it may concern:*

Be it known that I, ADAM GOOD, of the city and county of San Francisco, and State of California, have invented an Improved Composition for Preserving Eggs; and I do hereby declare the following to be a full, clear, and exact description thereof.

This invention has relation to immersing eggs in a solution or liquid compound consisting of borax, sugar, and lime, as hereinafter more fully set forth.

The solution is heated previous to dipping or immersing the eggs, and when dry on the latter will form a preserving-coat.

The proportion of each of the ingredients used is immaterial, but the borax will form the chief ingredient.

Eggs thus treated can be placed upon a shelf or packed in boxes and kept for an indefinite length of time without deteriorating. The hot solution drives out the excess of air contained in the shell, and as soon as the egg is removed from the solution the coating hardens upon the shell and seals the pores, leaving the egg smooth and clean.

Having thus described my invention, what I claim, and desire to secure by Letters Patent, is—

The herein-described solution or liquid compound for preserving eggs, consisting of borax, sugar, and lime, as set forth.

In witness whereof I have hereunto set my hand and seal.

ADAM GOOD. [L. S.]

Witnesses:
W. F. CLARK,
WM. FLOYD DUCKETT.